(12) United States Patent
Winnett

(10) Patent No.: US 6,603,848 B1
(45) Date of Patent: Aug. 5, 2003

(54) TECHNIQUES FOR PROVIDING CALLER NAME ANNOUNCEMENT

(75) Inventor: Steven Richard Winnett, Brookline, MA (US)

(73) Assignees: Genuity Inc., Burlington, MA (US); Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/362,081

(22) Filed: Jul. 27, 1999

(51) Int. Cl.⁷ ................................................ H04M 3/42

(52) U.S. Cl. .............................. 379/215.01; 379/88.21; 370/352

(58) Field of Search ..................... 379/211.01–213.01, 379/66.19, 88.25, 88.21, 215.01; 370/352, 389, 392

(56) References Cited

U.S. PATENT DOCUMENTS

| | | | | |
|---|---|---|---|---|
| 5,724,412 A | * | 3/1998 | Srinivasan | 379/93.23 |
| 6,047,046 A | * | 4/2000 | Smets et al. | 379/88.25 |
| 6,169,796 B1 | * | 1/2001 | Bauer et al. | |
| 6,473,612 B1 | * | 10/2002 | Cox et al. | |

* cited by examiner

*Primary Examiner*—Creighton Smith
(74) *Attorney, Agent, or Firm*—Leonard Charles Suchyta; James K. Weixel

(57) ABSTRACT

Disclosed is a system and technique for obtaining calling party information where existing "caller-id" techniques do not provide calling party information. Described is a service for a subscriber of a communication medium service for handling incoming calls when the subscriber is connected to the Internet. The techniques give a calling party a chance to provide information to the called party in the form of a voice recording in described circumstances, such as where caller identification information is unavailable if there is an unlisted phone number of a calling party.

40 Claims, 7 Drawing Sheets

TECHNIQUES FOR PROVIDING CALLER NAME ANNOUNCEMENT

BACKGROUND

1. Field of the Invention

This invention generally relates to communication mediums, and more particularly to techniques for identifying a calling party using a communication medium to contact a called party.

2. Description of Related Art:

Currently, a service known as "caller-id" is available to a subscriber of services for communication mediums to identify calling parties. For example, a telephone service subscriber may subscribe to a caller-id service to provide calling party information to the subscriber. Generally, this information identifies another party who is also a subscriber of the calling party telephone service. Similarly, another communication medium service is available for identifying a calling party using the caller-id techniques when the subscriber is connected, for example, to the Internet, and receives an incoming phone call to the same telephone number through which the subscriber is connected to the Internet. In this instance, a visual display of caller-id information appears on the called party's display device enabling the called party to decide, for example, whether or not to disconnect from the Internet to receive the incoming phone call.

The caller-id technology used in identifying a calling party has several drawbacks and limitations by failing to adequately identify a calling party in certain instances. One class of limitations is due to the unwillingness of the calling party to be identified to a called party. For example, when a calling party has an unlisted phone number, the called party is not relayed information as to the identity of the calling party. Similarly, when the calling party uses "blocking" for a single phone call, calling party identification information is not relayed to the called party for this particular phone call. Although some of these instances as to when a calling party is identified are in accordance with government regulations and laws, it is desirable to provide a technique for identifying a calling party in these instances.

A second class of limitations of failing to adequately identify a calling party using the current communication connection technology is due to associating a calling party with a subscriber of the communication medium service. For example there are instances when the service subscriber is identified and the calling party is not the service subscriber. Businesses, for example, may use a PBX having one central or main number and extensions used internally within the business. A calling party from within the business using the PBX cannot be adequately identified in that some internal extensions have no identifier. Alternatively, when a call originates from a PBX, a calling party may be identified by an internal extension, but still not identify a specific caller by name. Yet other examples of the inability to identify a calling party is when the calling party uses a pay phone, makes an international call, or uses a wireless or cellular phone. In these situations, it is also desirable to provide a technique for identifying the calling party.

Thus, there is required a technique for identifying a calling party to a subscriber of a communication medium service that is flexible and may be used in a variety of situations. In particular, a technique is needed which overcomes limitations of the existing caller-id technology and also minimizes additional overhead costs.

SUMMARY OF THE INVENTION

In accordance with principles of the invention is a method of providing calling party information to a called party. The called party connects to a computer network through a first communication connection using a first communication port. A routing of subsequent incoming communications is established from the called party's first communication port to a server. A communication is sent from a calling party to the called party at the first communication port. The communication is routed to the server. A message is relayed to the calling party requesting calling party information. The calling party information associated with the communication is relayed to the called party.

In accordance with another aspect of the invention is a system that provides calling party information to a called party. The system includes a computer network to which a called party connects through a first communication connection using a first communication port. The system also includes a server system. A communication router establishes a routing of incoming communications from the called party's first communication port to the server system when the called party is connected to the computer network. The system also includes communication lines through which communications are sent between the calling party and the called party. A first relaying means relays a message to the calling party requesting calling party information. A second relaying means relays the calling party information associated with the communication to the called party.

Thus, there is provided a technique for identifying a calling party to a subscriber of a communication medium service that is flexible and may be used in a variety of situations. In particular, a technique is needed which overcomes limitations of the existing caller-id technology and also minimizes additional overhead costs.

BRIEF DESCRIPTION OF THE DRAWINGS

The above-mentioned and other features of the invention will now become apparent by reference to the following description taken in connection with the accompanying drawings, in which.

DETAILED DESCRIPTION OF THE PREFERRED EMBODIMENTS

Figure 1:
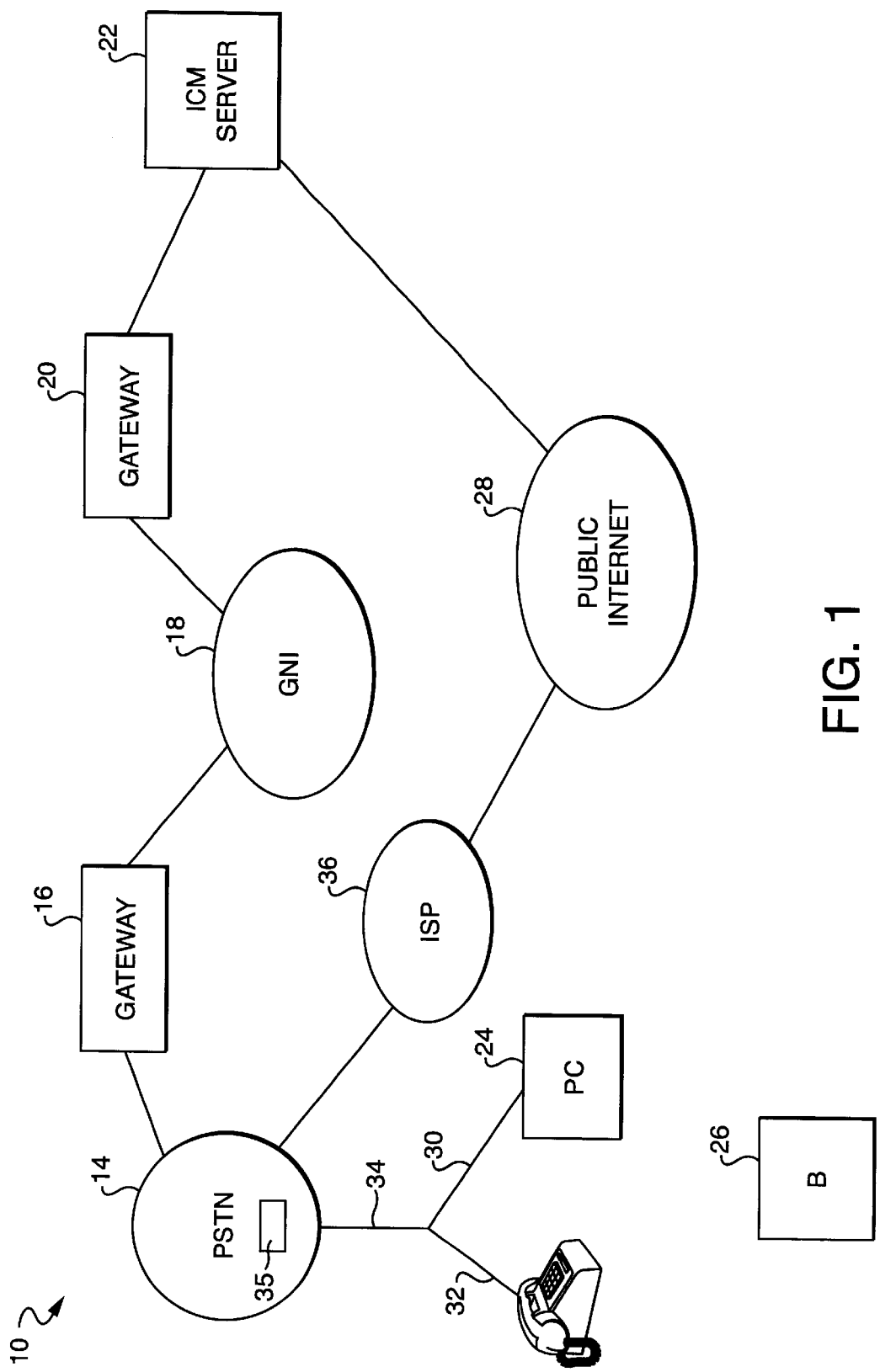
FIG. 1 is an example of an embodiment of a system that includes the invention showing a user logging onto the Internet.

Referring now to FIG. 1, shown is an embodiment of a system that includes the invention. What will be described in figures that follow are sequential steps in one embodiment of what happens in a system 10 of FIG. 1 when a caller A contacts another caller B across the telephone network. Shown in FIG. 1 is a user B 26 having a phone line 34 with two different communication connections 30 and 32. The communication connection 30 is used when B connects through a computer 24 through the telephone line using the Public Switch Telephone Network (PSTN) 14. Alternatively, B may be connected to the PSTN through telephone connection or communication medium connection 34 through his telephone 32. Still further, the PSTN 14 could be replaced by a connection through a cable network. In this particular embodiment, the communication connection 34 is a connection to the PSTN that provides, for example, a communication connection for home and business telephones and computers. B subscribes to a communication medium service referred to as Internet Call Manager (ICM) as offered by GTE Corporation™. Generally, services such as ICM provide a subscriber, such as B 26, with different calling services for a communication medium. In this particular example, the communication medium is a telephone line as connected to the PSTN. GTE's ICM product offers a subscriber various calling services that will be described in paragraphs that follow.

As shown in FIG. 1, B connects computer 24 to the PSTN 14, such as by dialing through the telephone line 34. The PSTN then forwards the call to an Internet Service Provider (ISP) 36, which allows B to connect through the computer 24 using PSTN 14 to the Public Internet 28.

It should be noted that the remaining items of FIG. 1, Gateway 16, Global Network Infrastructure (GNI) 18 and Gateway 20, will be discussed in connection with following figures. Generally, the connection from the PSTN 14 to the ICM server 22 using elements 16, 18 and 20 of FIG. 1 is used, for example, when a caller A calls B while B is connected on the Internet.

Once B 26 is logged on to the Public Internet 28 through the ISP 36, client software residing on the computer 24 executes and registers this connection with the ICM server 22. In this embodiment, server software residing on computer 24 is the client portion of the ICM client/server software application in which the server software executes in the ICM server 22. On the client side, the software executes in computer 24 monitoring B's usage of Internet connections. Once the client software on the computer 24 detects that there is a connection to the Public Internet 28, the client software executes to register this connection with the ICM server 22. This client software is part of the ICM product which B is provided as a subscriber of ICM services.

The ICM client software which executes on computer 24 may be written in any existing client server software. For example, the ICM client software that executes on computer 24 may be written in a commercially available programming language, such as the "C" programming language, whose object code may be executed on computer 24.

At this point in the example, B is logged on to the Public Internet. The ICM server 22 has been invoked to act as an interceptor of any incoming calls and provide the services for handling such calls to B as a subscriber of the ICM service.

Figure 2:
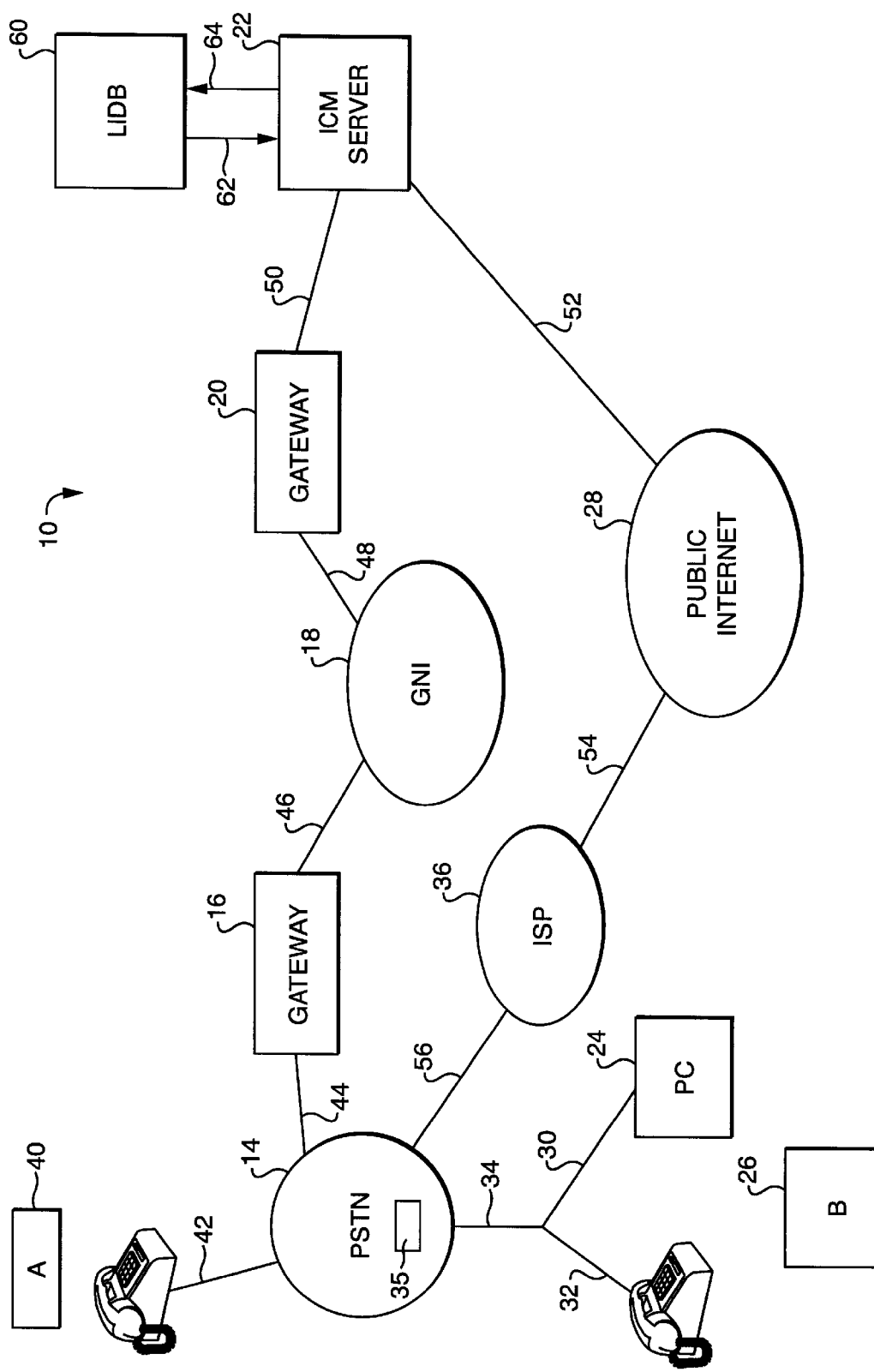
FIG. 2 is an example of an embodiment of the system of FIG. 1 with a calling party A contacting a called party B.

Referring now to FIG. 2, shown is an embodiment of the system 10 with B connected to the Internet and the ICM server intercepting a call from A to B. A 40 calls B through communication connection 42 using the PSTN 14. A's call is routed through the PSTN 14 to the ICM server 22 using Gateway 16, GNI 18 and Gateway 20. The PSTN detects that B's line is busy and forwards the call to the ICM server 22. The PSTN forwards A's call to Gateway 16 through connection 44. The connection 44 relays A's call to Gateway 16 in the ISDN (Integrated Services Digital Network)/PRI format. Gateway 16 converts the call into H.323 standard format. Generally, the H.323 standard is the protocol for voice over Internet Protocol (WP). Gateway 16 forwards A's call to GNI 18 over connection 46 in this H.323 protocol format. GNI 18 forwards the call over connection 48 to Gateway 20. Data is also in the H.323 standard when transmitted across connection 48 to Gateway 20. Gateway 20 converts the date of the call once again into the ISDN/PRI data format and transmits the data over connection 50 to the ICM server 22. The ICM server 22 notifies B 26 that an incoming call has been placed by A. B is notified on B's computer by the ICM server 22 using the Public Internet 28, the ISP 36, and the PSTN 14. In other words, B 26 is notified by ICM server 22 using connections 52, 54 and 56 that A is placing a call to B.

As previously described in conjunction with FIG. 1, B 26 is logged onto the Internet 28 through the ISP 36. The ICM server 22 knows where to send incoming calls for the subscriber B, should the subscriber B receive any phone calls while logged onto the Public Internet 28. In the system of FIG. 2, the line 34 has a status of "call forward busy" provisioned on it. In other words, B's phone line is provisioned, more specifically, to be forwarded to a local number for the ICM server. The PSTN forwards calls to a local phone number which communicates with the ICM server using connection 44 to Gateway. The PSTN may be programmed in advance of A calling B to forward calls to Gateway 16 by the use of a "call forward busy" trigger that may be programmed onto the subscriber B's telephone at the Central Office switch 35 immediately serving the subscriber B.

In this embodiment, a phone call, such as made by A calling B, is forwarded to Gateway 16, which is in this embodiment, one of many regional gateways. Generally, a regional gateway is one which receives phone calls for a particularly defined region. For example, a particular region may be defined with regard to an area code and an exchange of a phone number. A dedicated regional gateway may receive phone calls and be responsible for handling those incoming calls into a particular network with regard to a particular area code and exchange. An incoming call, such as from A to B, is then forwarded from the regional Gateway 16 across the GNI 18 to a national data center, via Gateway 20, which acts as a front end to the ICM server 22.

When B is logged onto the Internet as in FIG. 2, and A places a phone call to B, the PSTN 14 forwards the call to the ICM server 22, for example, using connections 44, 46, 48 and 50. When the ICM server 22 receives the forwarded call from A, the ICM server examines the incoming call to determine if that call has been forwarded from a telephone number which is that of an ICM subscriber. If so, the ICM server 22 also determines if the subscriber is currently online at a particular IP address. In this particular embodiment, the telephone number of the subscriber B provides a unique identifier equivalent to that of a social security number or an account number. For the ICM server 22, this phone number serves as a matching mechanism for determining when an incoming call is forwarded to a particular subscriber and where that subscriber is actually located. It should generally be noted that ICM server software may be produced using a commercially available programming language, or, as in this embodiment, may be a commercially available software program.

When the ICM server 22 examines an incoming call, one of three possible situations may exist. A first situation is when there is a calling party phone number and the ICM server is able to access information from a database, such as the Line Information Database (LIDB) 60 that may include calling party information to be displayed and presented to the called party B. A second situation is when there is no incoming phone number, for example, such as when the calling party has deliberately blocked the display of the calling party number, such as by using a sequence like "*66" preceding a phone call. In this second situation, no information may be obtained from the LIDB because no phone number is available to index into the database 60. The third situation that may exist is where a calling party number is present, but upon accessing the LIDB 60, no information may be obtained from the database 60. This may happen, for example, in a variety of situations, such as if a call is made from a cell phone or from a pay phone.

In one embodiment, the LIDB is a database which contains public telephone information, for example, of those businesses and listings as may be publicly available. In the example shown in FIG. 2, the ICM server 22 may obtain information for the calling party number from the LIDB. For example, the LIDB includes information for a calling party A if A's phone number is publicly available and a listed phone number. In this particular instance, the ICM server would obtain the calling party name which corresponds to the calling party number from the LIDB. This caller-id information is then displayed to User B 26 on computer 24.

In the first situation described above, in which a calling party phone number is available and information is obtained from the LIDB 60, the ICM server 22 displays information to user B upon a display device connected to the computer 24. In one embodiment, for the second and third situations where calling party information is not available or is not obtainable, the ICM server 22 plays a recorded message to the calling party requesting that the calling party identify themselves.

Generally, communications between the calling party A and the ICM server 22 are done using connections 42, 44, 46, 48 and 50. Similarly, communications between the ICM server 22 and the called party B 26 may be accomplished using connections 52, 54, 56 and 34. From 34, the communication is forwarded either to a computer 24 through connection 30, or to B's phone line using connection 32.

When the voice recording is played to the calling party by the ICM server 22, the calling party is given a predetermined time period within which to respond and identify themselves. Generally, if nothing is said by the calling party A within the predetermined time period, such as three seconds, or if the calling party disconnects, then the server: may not notify the ICM subscriber, B, of this call. Once the calling party starts to speak, the ICM server 22 records the calling party's identification sequence for another specified time period, such as three seconds. Alternatively, the calling party could be requested to respond by, pushing a predetermined number sequence on the phone keypad, e.g., *87, that would remove any caller identification blocks and thus allowing normal identification of the calling party.

It should also generally be noted that any of the voice recordings between the ICM server 22 and the calling party A may be stored, for example, in a sound file format such as a ".wav" file format, on the ICM server 22. This sound data file stored on an ICM server 22, such as the voice recording requesting that the calling party identify themselves, may be converted to various formats along the different connections between the ICM server and the calling party A.

It should generally be noted that the ICM server 22 may transmit data to the subscriber B in various data formats. In this embodiment, for example, the calling part message may be transmitted using the streaming audio format, as known to those skilled in the art. Other data relating to the calling party, such as the calling party's phone number that may be obtained from the LIDB, may be transmitted to the subscriber in accordance with User Data Protocol (UDP) format. Using these two data formats for communicating, the computer 24 and the ICM server system 22 handle data in accordance with UDP and TCP protocols. It should also be noted that in this embodiment, UDP was chosen due to the time dependent, or real-time nature, of the application. The streaming audio data format may also be used in communicating between the calling party A and the ICM server 22, for example, in recording the calling party's message and when playing a recorded message to the calling party requesting information. Other embodiments may transmit data in accordance with other communication protocols and standards.

In the previously described paragraphs, the ICM server 22 plays a voice recording requesting additional information from the calling party when no information is obtainable from the LIDB 60. As an alternative, other embodiments including the invention may always play the voice recording independent of whether or not information is accessible or obtained from the LIDB. Additionally, another embodiment including the invention may solely rely on playing the voice recording to obtain calling party information, and omit obtaining any information from the LIDB 60. In an embodiment in which the LIDB is never accessed and only the voice recording is played to obtain information about a calling party, the description of FIG. 2 may be modified such that connections 62 and 64 and database 60 are removed. Not using the LIDB may provide a desirable option for a service provider, for example, if accessing the LIDB has a high cost associated with it.

Once the ICM server 22 obtains calling party information, the ICM server 22 contacts the subscriber B 26. Additionally, the calling party A may be played a second recorded message notifying A that the person they are contacting, party B, is now being contacted. Generally, the purpose of this additional message to the calling party is to reassure the calling party that their identification has been taken and that they should therefore stay on the line while the called party is informed of their call. In this particular embodiment, the called party B is contacted by displaying a menu on the ICM client with the called party information.

Figure 3:
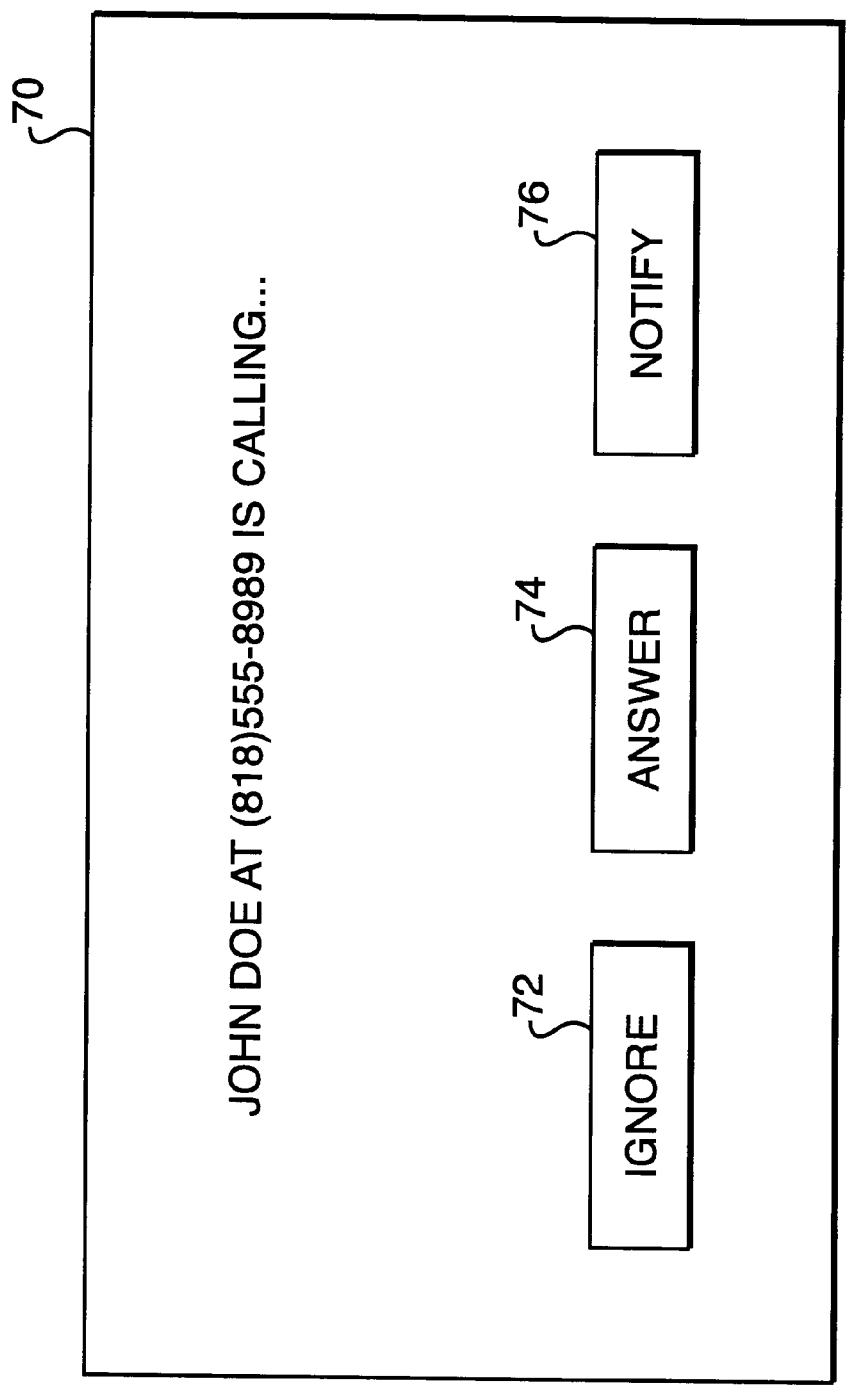
FIG. 3 is an example of an embodiment of a user interface as displayed on a called party's display device of a computer.

An example of the menu window that may be displayed to a called party who is a subscriber of the ICM service, such as user B, is illustrated in FIG. 3. This is described in paragraphs that follow.

The information forwarded from the ICM server 22 to the called party B 26 may include multimedia, as well as text data. In particular, the data communicated from the ICM server 22 over the public Internet 28 to user B may include audio as well as text information.

Referring now to FIG. 3, shown is an example of an embodiment of a user interface that may be displayed to user B on computer 24 when an incoming call is received while B is connected to the Internet. Generally, the window display 70 includes a message similar to the one included in FIG. 3 which includes the information of the calling party. This may include the name and phone number of the calling party if available. Additionally, a voice recording of the calling party A may be relayed and played to B if A has responded with a voice message of identification. In one particular embodiment, the sequence of displaying the message to the user on the screen 70 and playing the streaming audio identifying the caller may be repeated up to three times, or another specified number of times, until a subscriber B makes a selection from the window 70.

In this particular embodiment, B may make one of three selections including: ignore 72, answer 74, and notify 76. If the subscriber B selects the ignore option 72, a message may be relayed to calling party A, for example, to indicate that the person that A is trying to contact is not answering and to please try again later. This message relayed to A may be in the form of a voice recording similar to that which is played to A to obtain calling party information. The selection made by subscriber B, such as by selecting menu button 72, is relayed from user B's computer 24 using the public Internet connection 28 to the ICM server 22.

If the subscriber B selects the answer option, such as by selecting the button 74, the calling party A may be relayed a recorded message, for example, notifying A that the person that they are calling, B, is on the phone has been notified of the call. A is further requested to wait and that the called party B wishes to take the call. Subsequently, B logs off or disconnects from the Internet. The ICM server 22 then forwards the call through gateway 20, GNI 18, gateway 16, through PSTN 14 to the called party B. Alternatively, B may be able to take the call while maintaining the connection to the Internet so long as the connection 34 has the requisite capability to handle both communications simultaneously (e.g., using a digital subscriber loop or cable modem connection).

The subscriber B may also select the notify option 76. The calling party A in this instance may be relayed a message that the person they are calling is on the phone and has been notified of the call. Additionally, the calling party A may be notified that B will be returning the call shortly.

In summary, the ignore 72 and notify 76 options may cause unique messages to be relayed to the calling party A in each of these instances. In both of these instances, no further action is taken with regard to B's Internet session. This is in contrast in this embodiment to the actions and responses taken in regard to the subscriber B selecting the answer 74 option. In this instance, a recorded message may be relayed to A that the call is being forwarded to the called party B. Additionally B's Internet session is disconnected so that the call from A may be forwarded to B.

It should generally be noted that the display of FIG. 3 is an example of an interface that may be displayed on computer 24. Other embodiments of the screen display 70 are particular to each implementation of the software as provided by the subscription service for a user. It should also be noted that the ICM server 22 notifies the subscriber of the call by packaging all of the information regarding the calling party and forwarding this to User B at the computer 24.

Figure 4:
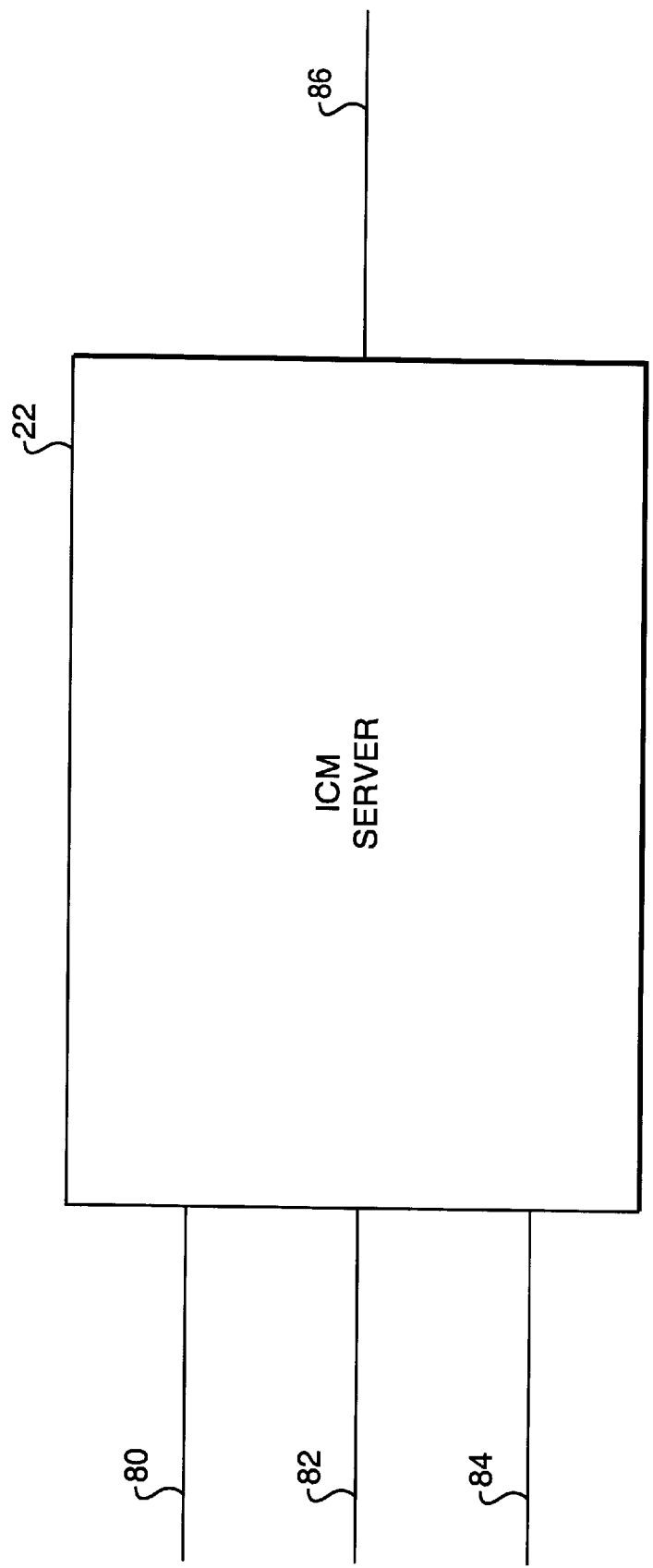
FIG. 4 is an example of an embodiment of the Internet Call Manager (ICM) server of FIG. 1.

Referring now to FIG. 4, shown is an example of an embodiment of the ICM server 22 as may be included in FIGS. 1 and 2 previously described. Generally, in this embodiment of FIG. 4, there are three ISDN PRIs 80, 82 and 84. Generally, there are a maximum of 8 PRIs in an embodiment of the ICM server. The ICM server 22 supports two interface types, including the ISDN PRI for interfacing with 80, 82 and 84, and an Ethernet interface for the Internet Protocol (IP) to interface with the Ethernet IP 86.

Generally, the ICM server may be a computer system which includes, for example, an operating system executing in a computer processor, memory, a disk drive and other peripheral devices as well as an Ethernet card and all required hardware for interfacing with the Ethernet and the ISDN PRIs. The operating system may be, for example, a UNIX operating system upon which the ICM server application may execute. The ICM server application executing on the ICM server 22, and the ICM client executing on the computer 24 of the subscriber may be any client/server application, and may be written in a standard, commercially available programming language, such as "C". The hardware in the ICM server may include, for example, a Pentium Intel™ processor, or other commercially available computer processor. It should generally be noted that other operating systems, such as Windows NT™ by Microsoft and LINUX™, and other client server software may be used capable of providing the function described in this specification.

Figure 5:
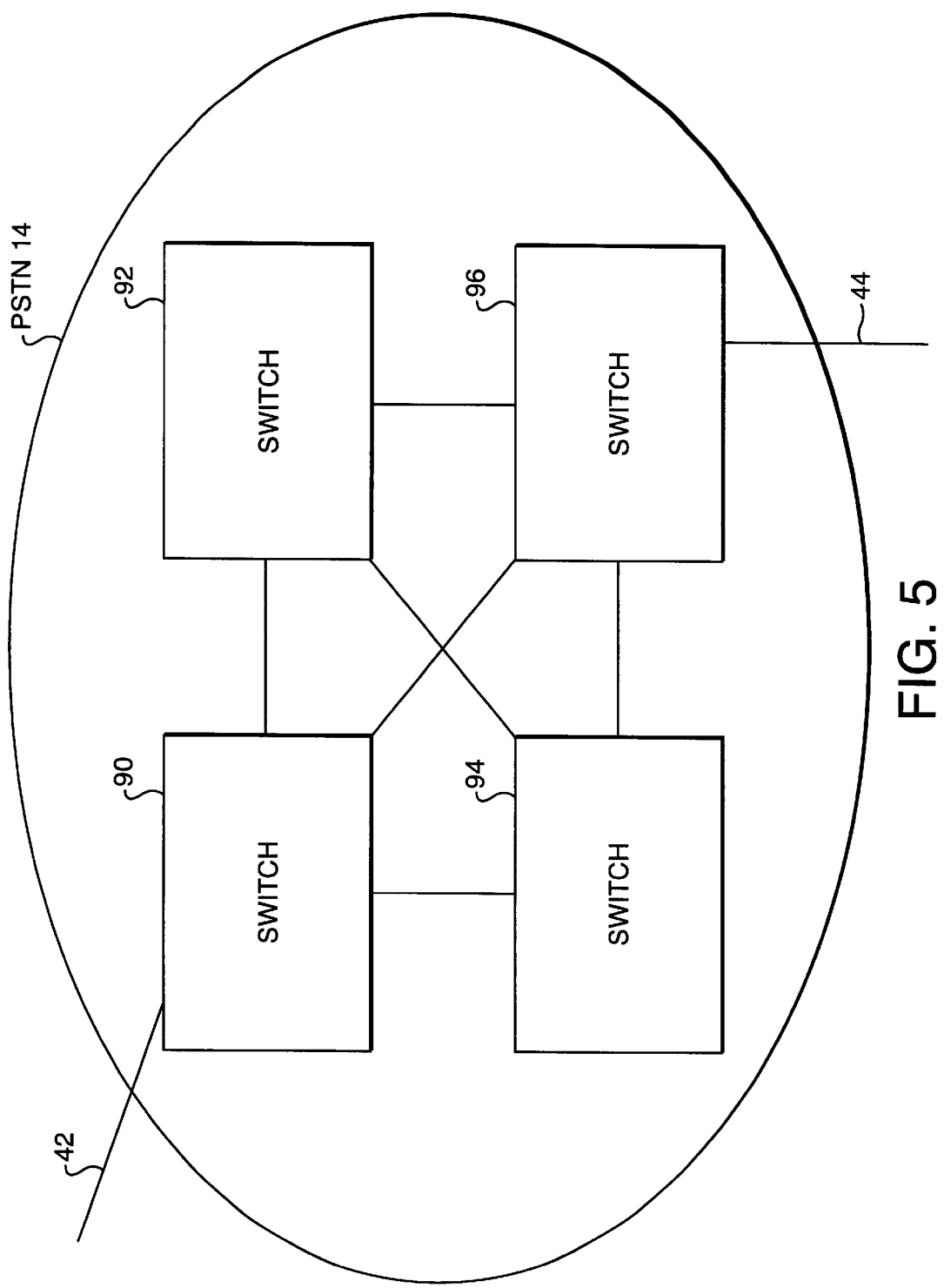
FIG. 5 is an example of an embodiment of the Public Switch Telephone Network (PSTN) of FIG. 1.

Referring now to FIG. 5, shown is an embodiment of the PSTN 14 as may be included in FIGS. 1–3. Generally, the PSTN 14 includes a plurality of switches 90, 92, 94 and 96. It should be noted that other embodiments may include a differing number of switches. Generally, the PSTN is given instructions or programmed to route calls for a particular phone number. For example, when B initially logs onto the Internet and the ICM server is established as the receiver of incoming calls when B is busy on the Internet, the PSTN routes all phone calls corresponding to B's phone number to the ICM server 22 via the local call forwarding or busy mechanism as previously described.

Figure 6:
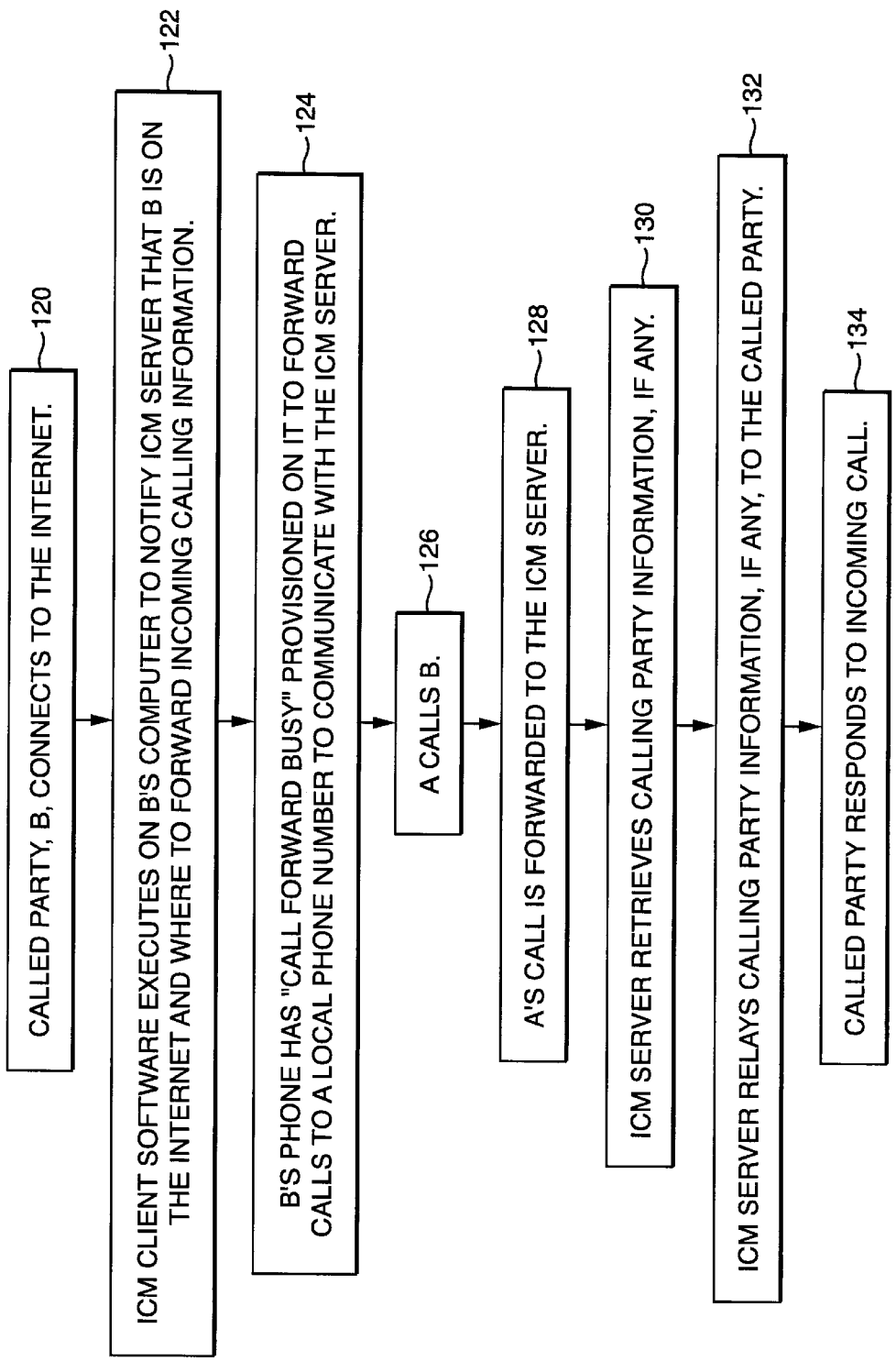
FIG. 6 is a flowchart of an example embodiment of a method for performing caller name announcement using the system of FIG. 1.

Referring now to FIG. 6, shown is an example of an embodiment of the steps previously described in conjunction with FIGS. 1, 2 and 3 for providing caller name announcement. At step 120, a called party B connects to the Internet. This was shown initially in FIG. 1. At step 122, the ICM client software executes on B's computer once B is logged onto the Internet to notify the ICM server 22 that B is on the Internet. Additionally, the ICM server 22 is instructed as to where to forward incoming call information using B's 10-digit telephone number as a unique identifier for routing calling party information. At step 124, B's phone call has "call forward busy" provisioned on it to forward calls to a local phone number to communicate with the ICM server. In other words, the PSTN 114 of FIG. 2 forwards calls to a local gateway 16.

As previously described, gateway 16 is local or regional with respect to the subscriber's phone number. This gateway 16 in turn communicates with the ICM server 22 to relay any incoming phone calls to the subscriber B's phone number. At step 126, a calling party A calls subscriber B. At step 128, calling party A's phone call is forwarded to the ICM server 22 since B is on the Internet and B's line is currently busy. At step 130, the ICM server which reads calling party information, if any. At step 132, the ICM server 22 relays calling party information, if any, to the called party B over the Internet 28 to B's computer system 24. At step 134, the called party B responds to the incoming call. As previously described, the called party may respond to an incoming call by selecting various options from a displayed window such as that depicted in FIG. 3.

Figure 7:
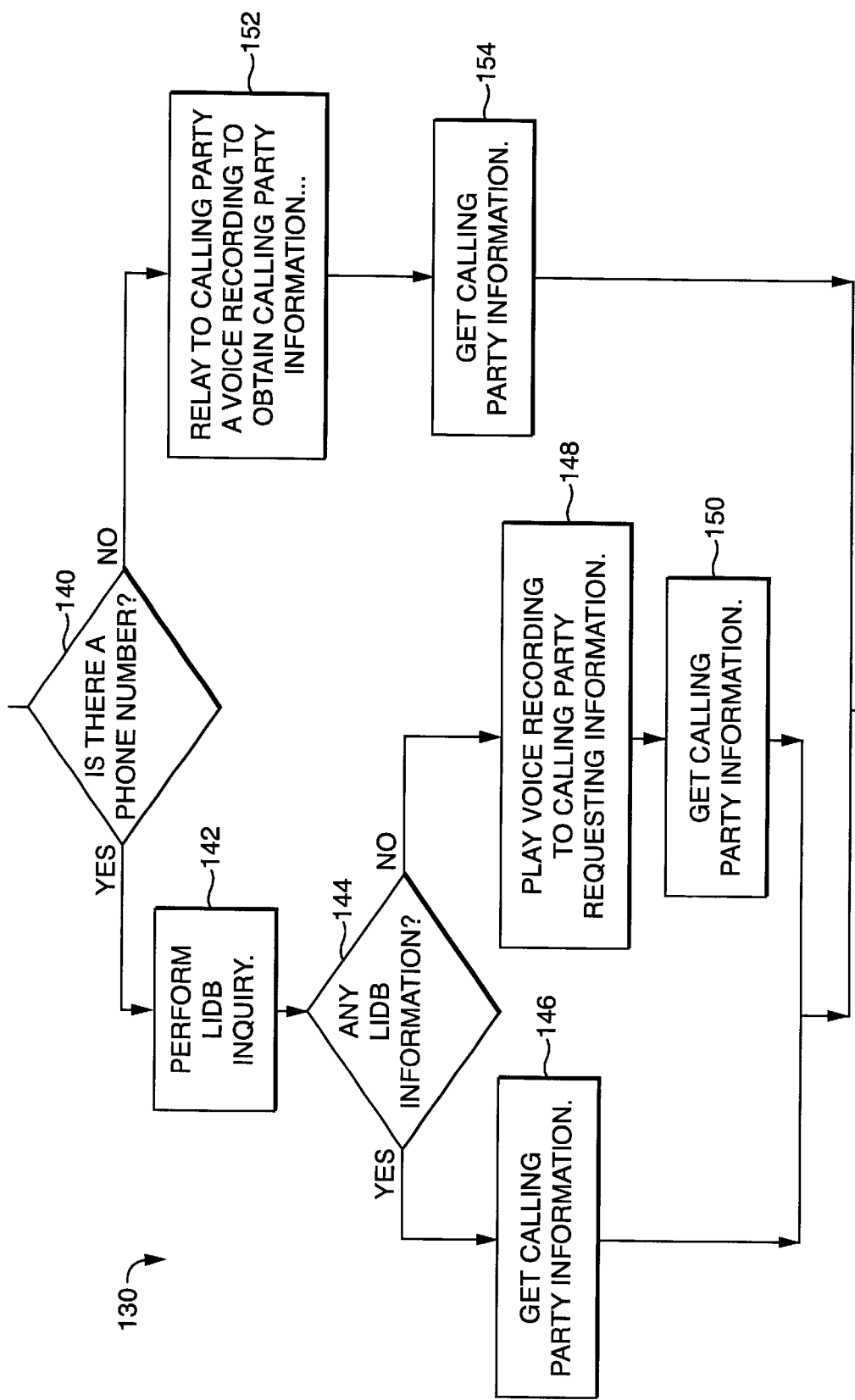
FIG. 7 is a flowchart of an example embodiment of the method steps by which an ICM server may retrieve calling party information as described in FIG. 6.

Referring now to FIG. 7, shown are more detailed processing steps of step 130 at FIG. 6 where the ICM server 22 retrieves calling party information, if any. At step 140, a decision is made as to whether or not there is an incoming party phone number available for use. If a decision is made at step 140 that there is a phone number available for use, an inquiry is made at step 142 to perform an LIDB inquiry where the ICM server 22 performs a lookup in the LIDB to possibly retrieve calling party information in accordance with a subscriber's phone number. At step 144, a decision is made as to whether there is any information retrieved from the LIDB. If there is information available in accordance with a calling party's phone number, at step 146, calling party information is retrieved from the LIDB. At step 144, if a decision is made that there is no LIDB information corresponding to an incoming party's phone number, control proceeds to step 148 where a voice recording is played to the calling party requesting additional information. At step 150, calling party information is obtained by a voice response from the calling party. It should be noted that if at step 150, the calling party does not respond with any information, in this particular embodiment, the ICM server does not relay any calling party information to the subscriber B. However, other embodiments may take different actions.

At step 140, if it has been determined that there is no phone number of a calling party available, control proceeds to step 152. Recall that a phone number may be unavailable, for example, if a party has used call blocking, or if a phone call is made from a pay phone. At step 152, a voice recording is relayed to the calling party to obtain calling party information. Similar to step 150, calling party information is obtained in the form of a voice response from a calling party.

It should be noted that as previously described, this embodiment, as depicted in flowcharts of FIGS. 6 and 7, is a method in which the voice recording to obtain calling party information is played when calling party information is unavailable from an LIDB, or other database. Other embodiments, as previously described, may request information from a calling party via a voice recording independent of whether information is available from a database such as the LIDB. Other embodiments, for example, may only do the voice recording to obtain calling party information and not perform any lookup in an existing database. Additionally, an embodiment may play a personalized message from a called party or a generic message, for example, to obtain calling party information.

What is claimed is:

1. A method of providing calling party information to a called party comprising:
   connecting the called party to a computer network through a first communication connection using a first communication port;
   establishing a routing of subsequent incoming communications from the called party's first communication port to a server;
   sending a communication from a calling party to the called party at the first communication port, said communication being routed to said server;
   relaying a message to the calling party requesting calling party information; and
   relaying said calling party information associated with said communication to said called party prior to routing said communication from said calling party to said called party.

2. The method of claim 1, further including:
   responding, by said called party, to said calling party information about said first communication.

3. The method of claim 2, further including:
   said calling party providing a verbal response stored as audio data in said server in response to said request for calling party information.

4. The method of claim 1, further including:
   accessing a database to obtain a portion of said calling party information.

5. The method of claim 4, wherein said server relays a message to the calling party requesting calling party information only if said calling party information is not obtained from said database.

6. The method of claim 4, wherein said server relays a message to the calling party in addition to accessing said database to obtain said calling party information.

7. The method of claim 1, wherein said step of establishing said routing is established prior to said sending a communication from a calling party to the called party, said routing being performed using a forwarding mechanism in a public switching telephone network.

8. The method of claim 1, further including:
   executing a client application on a called party's computer wherein said called party's computer is used in connection with said communication network.

9. The method of claim 1, wherein said server notifies said called party with said calling party information if said calling party provides said calling party information in response to said message.

10. The method of claim 9, wherein said called party is not notified about said communication from said calling party if said calling party does not provide calling party information in response to said message.

11. The method of claim 1, further including:
    displaying a user interface screen on a display device associated with said computer network of said called party, said user interface screen including a plurality of options from which said called party makes a selection, and also including said calling party information; and
    said called party making a selection from said plurality of options.

12. The method of claim 11, wherein said plurality of options includes an ignore option wherein, if selected, said calling party is notified that said called party does not wish to take the communication from the calling party.

13. The method of claim 11, wherein said plurality of options includes an answer option wherein, if selected, said calling party is notified that said called party wishes to take the communication from the calling party.

14. The method of claim 13 further including, when said answer option is selected:
    disconnecting said called party from said computer network and from said first communication port; and
    routing said communication from said calling party to said called party.

15. The method of claim 11, wherein said plurality of options includes a notify option wherein, if selected, said calling party is relayed a message that said called party will be contacting the calling party.

16. The method of claim 1, wherein said calling party information includes text data that is displayed on a display device that receives data associated with said first communication port.

17. The method of claim 1, wherein said calling party information includes audio data that is relayed to said called party by said server.

18. The method of claim 17, wherein said audio data includes a personalized message from the called party.

19. A system that provides calling party information to a called party comprising:
    a computer network to which a called party connects through a first communication connection using a first communication port;
    a server system;
    a communication router that establishes a routing of incoming communications from the called party's first communication port to said server system when said called party is connected to said computer network;
    communication lines through which communications are sent between the calling party and the called party;

first relaying means for relaying a message to the calling party requesting calling party information; and second relaying means for relaying said calling party information associated with said communication to said called party prior to routing said communication from said calling party to said called party.

20. The system of claim 19, further including:

responding means for having said called party respond to said calling party information about said first communication.

21. The system of claim 20, further including:

means for providing a verbal response from said calling party in response to said first relaying means, said verbal response being stored as audio data in said server system in response to said request for calling party information.

22. The system of claim 19, further including:

a database that includes a portion of said calling party information.

23. The system of claim 22, wherein said server system includes said first relaying means and relays a message to the calling party requesting calling party information only if said calling party information is not obtained from said database.

24. The system of claim 22, wherein said server system includes said first relaying means and relays a message to the calling party in addition to accessing said database to obtain said calling party information.

25. The system of claim 19, further including:

a client application that executes on a called party's computer wherein said called party's computer is used in connection with said first communication connection.

26. The system of claim 19, wherein said server system notifies said called party with said calling party information if said calling party provides said calling party information in response to said message.

27. The system of claim 26, wherein said called party is not notified about said communication from said calling party if said calling party does not provide calling party information in response to said message.

28. The system of claim 19, further including:

a display device associated with said computer network of said called party;

a user interface screen displayed on said display device wherein said user interface screen includes a plurality of options from which said called party makes a selection, and also including said calling party information; and a selection device used by said called party to make a selection from said plurality of options.

29. The system of claim 28, wherein said plurality of options includes an ignore option wherein, if selected, said calling party is notified that said called party does not wish to take the communication from the calling party.

30. The system of claim 28, wherein said plurality of options includes an answer option wherein, if selected, said calling party is notified that said called party wishes to take the communication from the calling party.

31. The system of claim 30 further including:

means for disconnecting said called party from said computer network and from said first communication port when said answer option is selected; and a router that routes said communication from said calling party to said called party.

32. The system of claim 28, wherein said plurality of options includes a notify option wherein, if selected, said calling party is relayed a message that said called party will be contacting the calling party.

33. The system of claim 19, wherein said calling party information includes text data that is displayed on a display device that receives data associated with said first communication port.

34. The system of claim 19, wherein said calling party information includes audio data that is relayed to said called party by said server system.

35. The system of claim 34, wherein said audio data includes a personalized message from the called party.

36. The system of claim 19, wherein said communication router includes a forwarding mechanism in a public switching telephone network to forward a called party's communications when said called party is connected to said computer network.

37. An apparatus for providing calling party information to a called party comprising:

means for connecting the called party to a computer network through a first communication connection using a first communication port;

means for establishing a routing of subsequent incoming communications from the called party's first communication port to a server;

means for sending a communication from a calling party to the called party at the first communication port, said communication being routed to said server;

means for relaying a message to the calling party requesting calling party information; and means for relaying said calling party information associated with said communication to said called party prior to routing said communication from said calling party to said called party.

38. The apparatus of claim 37, further including:

means for responding, by said called party, to said calling party information about said first communication.

39. The method of claim 38, further including:

means for said calling party providing a verbal response stored as audio data in said server in response to said request for calling party information.

40. A program product for providing calling party information to a called party in a communications system when the called party is coupled to the Internet, said communication system having a server, said program product comprising:

computer readable data storage for storing program product instructions;

machine readable routing instructions establishing a routing of incoming communications from the called party to said server;

machine readable sending instructions for sending a communication from the calling party to the called party, and to said server;

machine readable requesting instructions for relaying a message to the calling party requesting calling party information; and machine readable relaying instructions for relaying said calling party information to said called party prior to routing said communication from said calling party to said called party.

* * * * *